Patented Nov. 27, 1923.

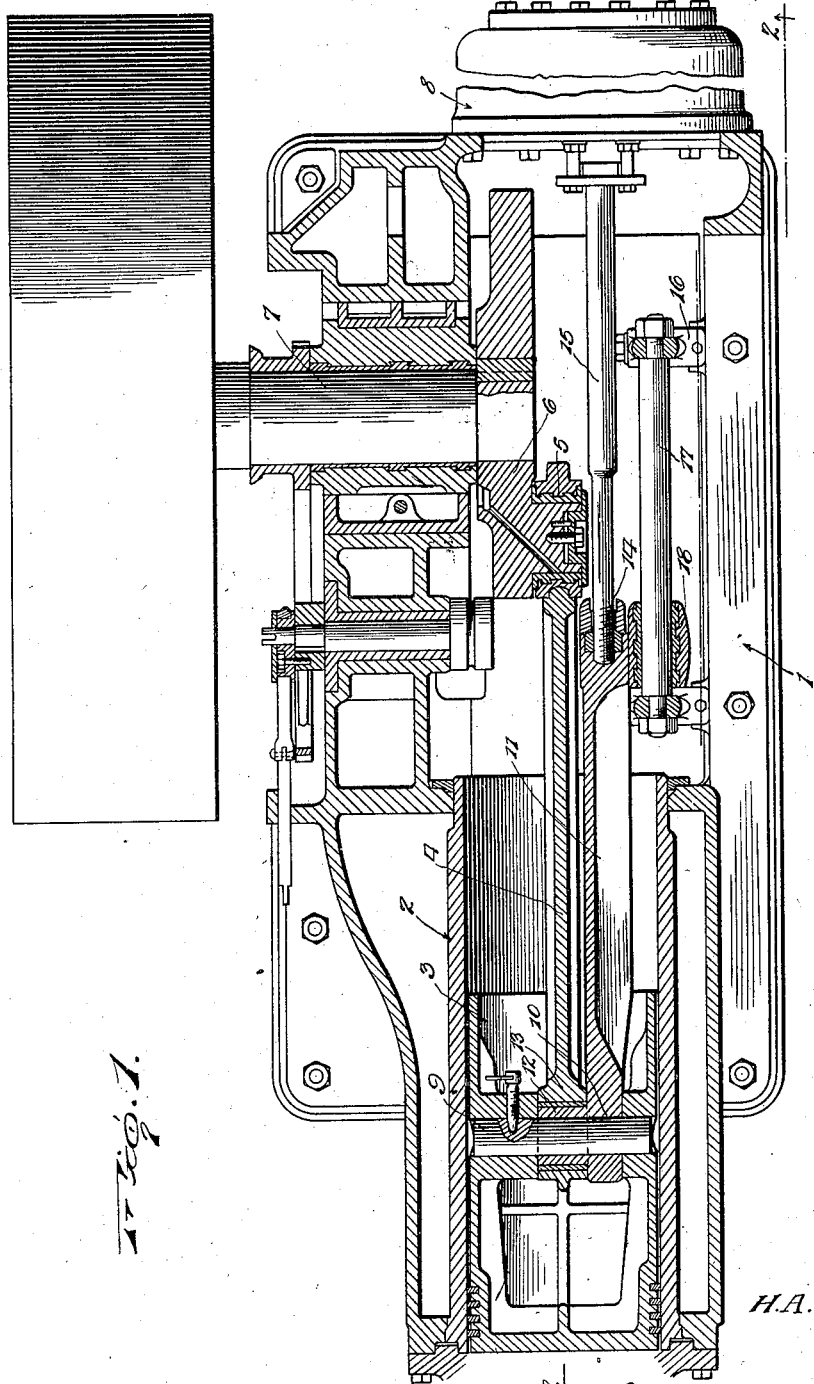

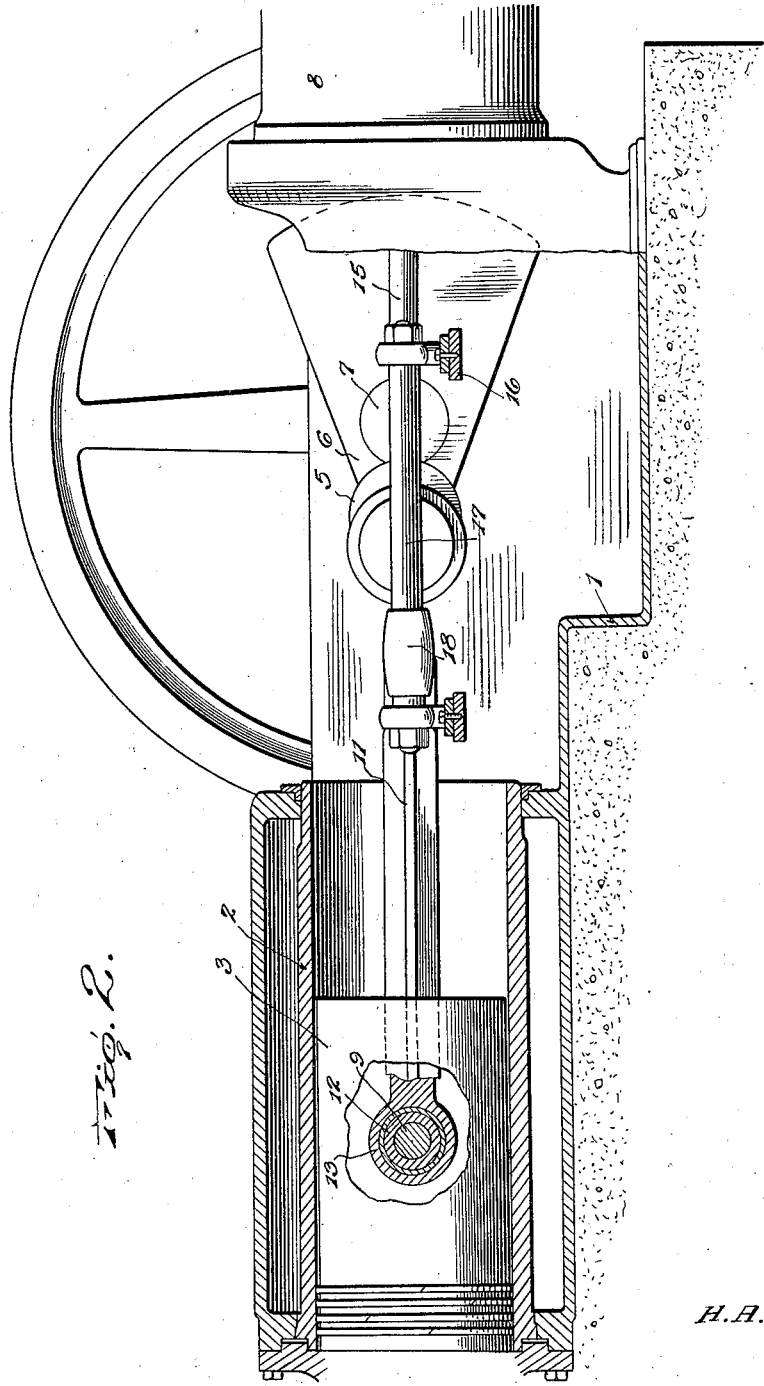

1,475,381

UNITED STATES PATENT OFFICE.

HEWITT A. GEHRES, OF MOUNT VERNON, OHIO.

COMPRESSOR UNIT.

Application filed August 23, 1922. Serial No. 583,817.

*To all whom it may concern:*

Be it known that I, HEWITT A. GEHRES, a citizen of the United States, residing at Mount Vernon, in the county of Knox and State of Ohio, have invented certain new and useful Improvements in Compressor Units, of which the following is a specification.

This invention relates to improvements in means for directly driving air compressors, and similar units in which the piston of the compressor or the like is operated from an engine also constituting an element of the unit, and the primary object of the invention is to provide a novel drive connection between the engine and compressor pistons.

In compressors and similar apparatus of the class above outlined, it is desirable to simplify the construction and operation of the parts to the greatest possible extent and to economize in space and the present invention therefore has as one of its primary objects to provide a driving connection between the engine piston and the compressor piston, extremely simple in its construction and adapting the engine and compressor to be located much nearer each other than has heretofore been possible.

Another object of the invention is to provide a substantially direct connection between the engine piston and the piston rod of the compressor, the connection between the parts being such as to compensate for any slight misalinement of the parts and prevent binding.

In the accompanying drawings:

Figure 1 is a horizontal sectional view through a compressor unit embodying the invention;

Figure 2 is a vertical longitudinal sectional view on the line 2—2 of Fig. 1.

The numeral 1 indicates in general the foundation of the apparatus upon which is mounted a gas engine 2 of the type usually employed in units of this class, the piston of the engine being indicated by the numeral 3 and the connecting rod by the numeral 4, the said rod having the usual connection 5 with the crank 6 upon the engine crank shaft 7, this shaft being mounted between the adjacent ends of the engine and compressor as is customary, and the said compressor being of any suitable type and indicated in general by the numeral 8. The piston 3 embodies a wrist pin 9, and there is fitted to this wrist pin a bearing head 10 at one end of a slide rod 11, the head 10 being provided with a lateral extension 12 likewise fitting the wrist pin 9 and exteriorly cylindrical to constitute a journal for a bearing head 13 at the end of the connecting rod 4. Thus while the heads 10 and 13 of the slide rod 11 and connecting rod 4 are positioned, in a sense, side by side upon the wrist pin 9, the journaling of the head 13 upon the lateral extension 12 of the head 10 of the slide rod provides for the exertion of a substantially direct thrust upon the said slide rod, and further insures against canting or distortion of the engine piston in the engine cylinder, all strains due to the compressor drive being off center from the engine being taken up by the slide rod 11 and not transmitted to the engine piston. At its end opposite its head 10, the slide rod 11 is connected as at 14 with the end of the piston rod 15 of the compressor 8.

Brackets 16 are mounted upon the engine frame or base 1 and a rod 17 is mounted at its ends in these brackets and supports a slide 18 carried by the last-mentioned end of the slide rod 11 and displaced laterally with relation thereto, the rod 17 extending parallel to the slide rod 11 and piston rod 15.

By the simple means above described substantially a direct thrust connection is provided between the piston of the engine and the piston of the compressor; the assemblage of parts is such as to reduce to a minimum canting or distortion of the engine piston; the parts are suitably supported and guided in their movement by but a single slide whereas it has heretofore been customary to employ two slides with the rods between or two slides with two connecting rods; and the structure is greatly simplified and, by the elimination of a second slide, the required distance between the engine and compressor cylinders may be greatly reduced thus rendering the structure more compact and substantial.

It will be evident that while the bearing head 12 is snugly journaled to the wrist pin of the engine piston and the slide rod 11 is driven directly from the piston, the head may have slight rotative play about the wrist pin so as to compensate for any slight misalinement of the guide 17 in a vertical plane. Also it will be evident that the slide 18 is capable of slight rotative play upon the guide rod 17, and this will compensate for any slight displacement of the engine piston above or below the plane in which the rod 17 is located.

Having thus described the invention, what is claimed as new is:

1. In a compressor unit, in combination with the engine piston and the associated wrist pin and connecting rod, and the piston rod of the compressor, a slide rod having a bearing head fitting the wrist pin of the engine piston and provided with a lateral extension upon which the connecting rod is journaled, the slide rod having direct connection with the piston rod of the compressor.

2. In a compressor unit, in combination with the engine piston and connecting rod, and the piston rod of the compressor, a slide rod connected directly with the engine piston and provided with means journaling the said connecting rod, the said slide rod being directly connected with the piston rod of the compressor.

3. In a compressor unit, in combination with the engine piston and the piston rod of the compressor, a slide rod connected directly with the engine piston and with the piston rod of the compressor, and a supported slide associated with the slide rod adjacent its connection with the piston rod of the compressor.

4. In a compressor unit, in combination with the engine piston and its wrist pin, and the piston rod of the compressor, a slide rod connected directly with the wrist pin of the engine piston and with the piston rod of the compressor, the said slide rod being capable of limited rotative play about the wrist pin, and a supported slide associated with the slide rod adjacent its connection with the piston rod of the compressor.

5. In a compressor unit, in combination with the engine piston and the piston rod of the compressor, a slide rod connected directly with the engine piston and with the piston rod of the compressor, a guide supported substantially parallel to the line of reciprocation of the slide rod, and a slide associated with the slide rod and with the guide and capable of limited play rotatably with relation to the said guide.

In testimony whereof I affix my signature.

HEWITT A. GEHRES. [L. S.]